(12) United States Patent
Iwata

(10) Patent No.: US 7,648,218 B2
(45) Date of Patent: Jan. 19, 2010

(54) PRINTER OPERABLE AS A PLURALITY OF KINDS OF DEVICES AND CONTROL METHOD THEREFOR

(75) Inventor: Dan Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/767,738

(22) Filed: Jan. 30, 2004

(65) Prior Publication Data

US 2004/0252150 A1    Dec. 16, 2004

(30) Foreign Application Priority Data

Jan. 31, 2003    (JP) .............................. 2003-023816
Jan. 7, 2004    (JP) .............................. 2004-002060

(51) Int. Cl.
*B41J 29/393* (2006.01)
(52) U.S. Cl. ...................................... 347/19
(58) Field of Classification Search ...................... 347/5, 347/19
See application file for complete search history.

(56) References Cited

U.S. PATENT DOCUMENTS

| 6,151,041 | A | * | 11/2000 | Bolash et al. | ................. | 347/19 |
| 6,155,664 | A | * | 12/2000 | Cook | ............................. | 347/7 |
| 6,352,327 | B1 | * | 3/2002 | Yano et al. | ..................... | 347/14 |
| 6,568,785 | B1 | * | 5/2003 | Edelen et al. | ................. | 347/19 |
| 2002/0171703 | A1 | * | 11/2002 | Phillips et al. | ................ | 347/19 |
| 2003/0007027 | A1 | * | 1/2003 | Saruta | .......................... | 347/19 |
| 2003/0174180 | A1 | * | 9/2003 | Nunokawa | ..................... | 347/5 |

FOREIGN PATENT DOCUMENTS

| JP | 5-238104 | 9/1993 |
| JP | 7-175613 | 7/1995 |
| JP | 8-123631 | 5/1996 |
| JP | 8-328777 | 12/1996 |
| JP | 2000-15906 | 1/2000 |

OTHER PUBLICATIONS

Official Communication dated Sep. 21, 2007, issued in corresponding EP application No. 04 002 091.9.

* cited by examiner

*Primary Examiner*—Julian D Huffman
*Assistant Examiner*—Jason S Uhlenhake
(74) *Attorney, Agent, or Firm*—Fitzpatrick, Cella, Harper & Scinto

(57) ABSTRACT

A printing apparatus for effecting printing using a recording head mounted thereto includes a communicating section for communication with an information processing apparatus; a control section for determining a kind of device among a plurality of kinds in response to a predetermined operation for setting the kind of the printing apparatus, and operable for the kind thus determined; a discrimination section for discriminating whether the kind of device is determined or not; and a communication control section for controlling communication with the information processing apparatus by the communicating section in accordance with a result of discrimination of the discrimination section.

16 Claims, 12 Drawing Sheets

PRINTER OPERABLE AS A PLURALITY OF KINDS OF DEVICES AND CONTROL METHOD THEREFOR

FIELD OF THE INVENTION AND RELATED ART

The present invention relates to a printing apparatus operable as a plurality of printing apparatuses different in type (specifications), and capable of communicating with an information processing apparatus through a predetermined communicating medium. It also relates to a method for controlling said printing apparatus.

Printing apparatuses are different in operational parameters, for example, paper size (largest size of printing paper usable with apparatus), color in which an image is printed (monochromatic, color, etc.), processible image data format, optimal operational mode, etc. Therefore, unless a printing command sent from an information processing apparatus to a printing apparatus is compatible in format with the printing apparatus, the printing apparatus cannot properly perform. In other words, an information processing apparatus must be capable of identifying in advance the type of the printing apparatus to which a printing command is going to be sent. In the case of a printing system comprising the combination of a printing apparatus of the PnP (Plug and Play) type, and an information processing apparatus, the printing apparatus and information processing apparatus are enabled to communicate with each other in order to enable the information processing apparatus to automatically identify the type of the printing apparatus, so that a printing command (printing data) compatible with the printing apparatus will be sent to the printing apparatus.

As a printing apparatus is connected to an information processing apparatus, the identification of the printing apparatus, and formatting of printing data, are accomplished through the following steps.

That is, as a printing apparatus is connected to an information processing apparatus, the information processing apparatus asks the printing apparatus for the apparatus identification data comprising the apparatus type, manufacturer name, apparatus model, etc. At this point, the information processing apparatus does not know even that the device which has just been connected thereto is a printing apparatus. As soon as the printing apparatus receives the query from the information processing apparatus, the printing apparatus sends its identification data to the information processing apparatus. As a result, the information processing apparatus recognizes, based on the apparatus identification data received from the printing apparatus, that the device having just been connected thereto is a printing apparatus, and at the same time, the information processing apparatus recognizes the manufacturer and type of the printing device. Then, the information processing apparatus registers the setup file matching the connected printing apparatus.

In order to print an image, the information processing apparatus sets up the printing control parameters, such as the aforementioned paper size, color in which an image is printed, and image data format, and sends a printing command along with the set parameters.

Japanese Laid-open Patent Application 05-238104 discloses a recording apparatus designed so that it can be operated as a plurality of recording apparatuses different in type (specifications), or so that its type (specifications) can be switched as necessary. This recording apparatus is provided with a removably mountable storage means for storing programs, fonts, etc., so that the type (specifications) of the apparatus can be changed by replacing the storage means. Further, Japanese Laid-open Patent Application 2000-015906 discloses a recording apparatus, in which the controller comprises a controller proper and a module independent from the controller proper, making it possible to change the type (specifications) of the printing apparatus by replacing the module portion of the controller.

In the case of a printer design such as the above-described one in which an information processing apparatus identifies the printing apparatus connected thereto, and carries out necessary setup operations, there will be no problem as long as a printing apparatus connected to an information processing apparatus is such a printing apparatus that is not changeable in type (specifications) and possesses its specifications (apparatus type identification data).

However, in the case of a printing apparatus operable as a plurality of printers different in type (specifications), there is the problem that an information processing apparatus cannot identify the type (specifications) thereof even if the printing apparatus is connected thereto. For example, some apparatuses are nonspecific in type at the point of purchase, and are specified in type by the operation carried out by the user. It is possible that if one of such apparatuses is connected to an information processing apparatus without being specified in type, problems will occur.

As one of the examples of such printing apparatuses, there is a printing apparatus, the main assembly of which is operable as the main assembly for a printer which uses pigment ink, or the main assembly for a printer which uses dye ink.

Such a printing apparatus is presumed to be structured so that a recording head for pigment ink, a recording head for dye ink, an ink container for pigment ink, and an ink container for dye ink, are removably mountable, and mounting of a recording head or an ink container in the printer decides whether the printing apparatus is operated as a pigment ink printer or a dye ink printer.

Generally, a printer which uses pigment ink and a printer which uses dye ink are not identical in control, and also, in the data generated by an information processing apparatus as a host apparatus. Thus, the two printers should be identified as two printers completely different in type.

However, a printer such as the one designed as described above remains as a printer of a nonspecific type until a recording head or an ink container is mounted. Therefore, it is possible that problems will occur during the "Plug and Play" process in which a host apparatus identifies the type of the printer connected thereto. In other words, if a printer operable as a plurality of printers different in type (specifications) is asked by an image processing apparatus for apparatus identification data before a decision is made about the type (set of specifications), which the printer is to be operated as, the printing apparatus cannot specify the apparatus identification data to be transmitted to the information processing apparatus.

As a solution to the above described problem, it is possible to assign a temporary apparatus type (set of specifications) to a printer. In such a case, the printer transmits printer identification data in accordance with the temporary apparatus type to an information processing apparatus. Thus, setup files corresponding to the printer identification data in accordance with the temporary apparatus type are registered in the information processing apparatus. This creates the problem that as a specific apparatus type is selected later for the printer, the selected apparatus type does not match the registered setup files in the information processing apparatus. When the apparatus type data (specifications) of the printing apparatus connected to the information processing apparatus do not match the registered setup files in the information processing apparatus, the printer cannot print. In other words, the process for registering the setup files in accordance with the temporarily assigned apparatus type is an unnecessary process for the information processing apparatus.

SUMMARY OF THE INVENTION

The present invention was made to solve the above described problems, and its primary object is to eliminate the nuisance (problem) which occurs as a device operable as a plurality of devices different in apparatus type is connected to an information processing apparatus. More specifically, the primary object of the present invention is to provide a printing apparatus, the communicating means of which can be controlled according to the determination regarding whether or not a specific apparatus type, which the printing apparatus is to be operated as, has been assigned to the printing apparatus, and a method for controlling said printing apparatus.

According to an aspect of the present invention, there is provided a printing apparatus for effect printing using a recording head mounted thereto, said apparatus including communicating means for communication with an information processing apparatus, said apparatus comprising: control means for determining a kind of device among a plurality of kinds in response to a predetermined operation for setting the kind of the printing apparatus, and operable for the kind thus determined; discrimination means for discriminating whether the kind of device is determined or not; and communication control means for controlling communication with the information processing apparatus by the communicating means in accordance with a result of discrimination of said discrimination means.

According to another aspect of the present invention, there is provided a control method for a printing apparatus for effecting printing using a recording head mounting thereto, said apparatus including communicating means for communication with an information processing apparatus, said method comprising a step of determining a kind of device among a plurality of kinds in response to a predetermined operation for setting the kind of the printing apparatus, and operable for the kind thus determined; a step of discriminating whether the kind of device is determined or not; and a control step of controlling said apparatus in accordance with the determined kind of device, and controlling the communication of said communicating means with an information processing apparatus, when a result of the discrimination is affirmative.

As described above, the present invention solves the problem that if a printing apparatus operable as a plurality of printing apparatuses different in type (specifications), connected to an information processing apparatus through a communicating medium, is asked by the information processing apparatus, for the printing apparatus identification data, before the printing apparatus type is identified, the printing apparatus identification data to be generated in the printing apparatus and transmitted to the information processing apparatus cannot specified. The present invention also eliminates the processes principally unnecessary, but carried out, as a conventional means, by the information processing apparatus when the printing apparatus is made to send a temporary assigned printing apparatus type to the information processing apparatus, in order to avoid the occurrence of the above described problem.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described in detail with reference to the appended drawings.

Embodiment 1

Figure 1:
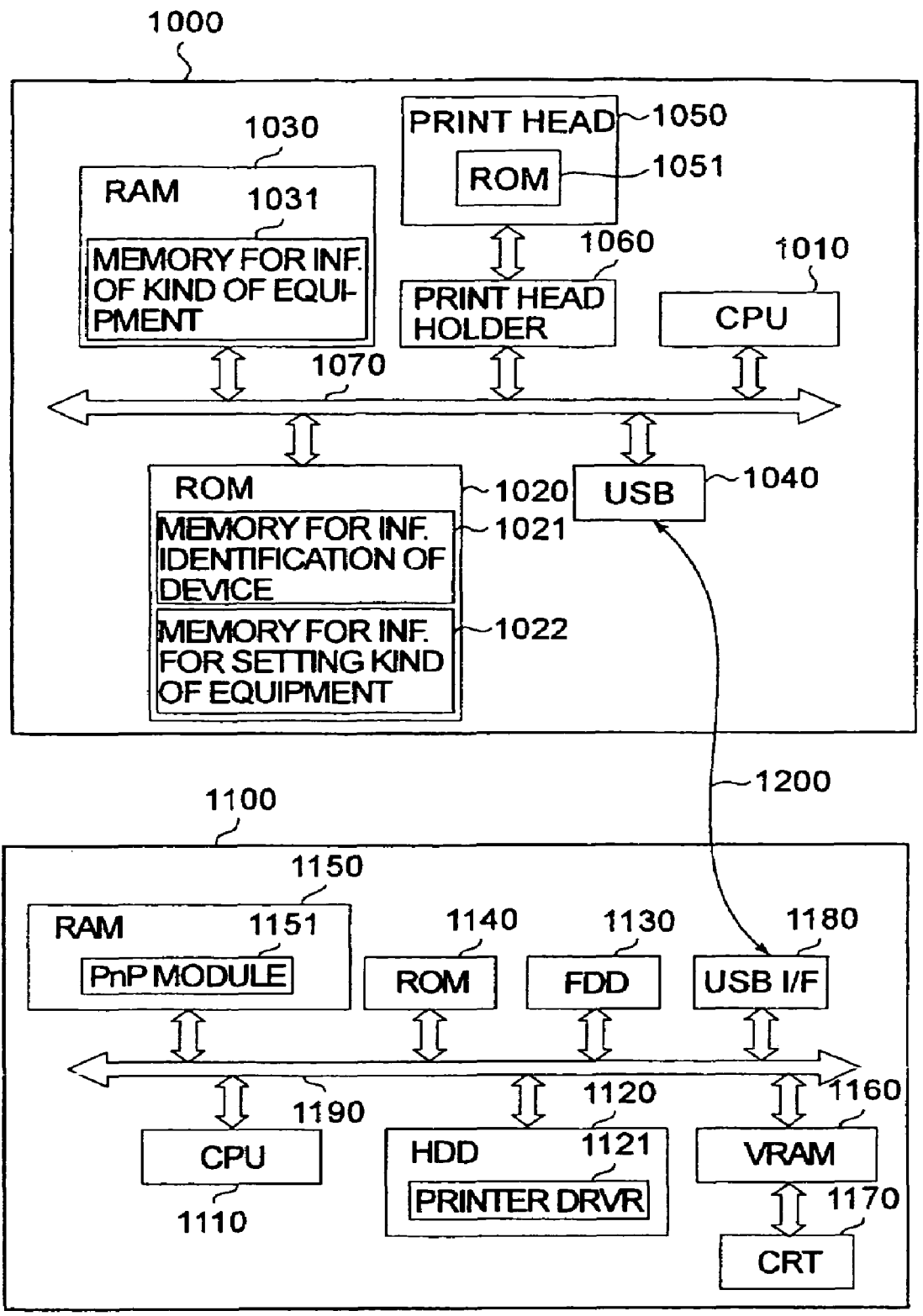
FIG. 1 is a block diagram of a printing system, to which the present invention is applicable, showing the general structure thereof.

FIG. 1 shows the general structure of the printing system, to which the present invention is applicable. The printing system is the combination of a printing apparatus and an information processing apparatus. The drawing shows only the components essential to the application of the present invention.

First, an inkjet printer 1000 (which hereinafter will be simply referred to as "printer"), will be described. The printer 1000 comprises: a CPU 1010 which controls the printer 1000; a ROM 1020 which stores the program for controlling the entirety of the printer; a RAM 1030 used for writing or reading various data while the printer 1000 is in operation; a USB (universal Serial Bus) I/F 1040 as a communicating means; a removably mountable printing head 1050; and a printing head holder 1060 with which the printing head is solidly held to the printer 1000. The CPU 1010 which controls the printer 1000 functions as the communicating means, printing apparatus controlling means, discriminating means, and communication controlling means. Each of the aforementioned essential components is connected to the CPU 1010 through a system bus 1070. The apparatus type identification data and apparatus setup data are stored in the apparatus type identification storage portion 1021 and apparatus setup data storage portion 2022, respectively, of the ROM 1020. The apparatus type data are stored in the apparatus type data storage 1031 of the RAM 1030.

Next, the host computer 1100 as an information processing apparatus will be described. The CPU 1110 is in charge of the control of the entirety of the host computer 1100. The HDD (Hard Disk Drive) 1120, and FDD (Floppy Disk Drive) 1130 store a boot program, various application software, image data, print setup files, printer drivers (print control command generation programs) 1121, etc. Incidentally, the choice of the medium for storing these files does not need to be limited to the HDD and FDD. It may be any medium capable of storing and retaining the data. The ROM 1140 stores the various data and programs. The RAM 1150 is used for writing or reading various data. The VRAM 1160 is connected to the CRT 1170 which provides a user with visual information inclusive of a print setup window. The USB I/F 1180 is a communicating means through which the host computer is allowed to communicate with peripheral devices. In the RAM 1150, the OS (Operation System) compatible with PnP (Plug and Play) of the USB is in action. The PnP module 1151 constitutes the essential portion of the OS system related to PnP. The PnP is a function for automatically detecting the identity of the device connected to the host computer. In other words, in the case of the printing system in FIG. 1, the device detected by the PnP module 1151 is the printer 1000, because the printing apparatus connected to the host computer 1100 as an information processing apparatus is the printer 1000. Generally, as a printer, that is, a peripheral device, is connected to a printing system, the printer driver compatible with the connected printer is automatically installed in a host computer by the function of the PnP. The system bus 1190 interconnects the components of the printer 1000.

The printer 1000 and host computer 1100 are connected to each other through the USB cable 1200 as a communication medium. As the host computer 1100 transmits a print command to the printer 1000 through the interface, the printer 1000 carries out the printing operation.

Next, the printing operation of the printing system will be described in general terms, assuming that the printing system is ready for a printing operation. A user is to set up the print specifications, for example, paper size, paper type, image quality, number of copies, etc., using the print setup table displayed on the CRT 1170. The printer driver 1121 prepares a multiple-choice print option table, and displays the table on the CRT 1170 to allow the user to properly set up the printing operation.

As a print command is issued by a user after the user finishes making selections, printing data are generated in accordance with the selections made by the user. Then, the print command, selected print settings, and generated printing data are transmitted to the printer 1000 through the USB cable 1200. As the printer receives the print command, print setup data, and printing data, the CPU 1010 of the printer 1000 interprets the printer setup data, and converts the image data in accordance with the print setup data. Then, the printer 1000 prints images by moving the printing head 1050 in accordance with the converted image data.

Next, the printer 1000 will be described in more detail.

The printer 1000 is such a printer that can be operated as a dye ink printer or a pigment ink printer. In other words, the printer 1000 is capable of functioning either as a dye ink printer or a pigment ink printer. Here, it is assumed that a dye ink printer means a printing apparatus structured to use dye ink, and a pigment ink printer means a printing apparatus structured to use pigment ink.

A dye ink printer is different from a pigment ink printer not only in the type of ink used for printing, that is, which ink is used for printing, dye ink or pigment ink, but also, in the printing head driving condition, image processing method, etc. The printer 1000 in this embodiment is set up as either a dye ink printer or a pigment ink printer, by the apparatus type identification sequence, which will be described later; the difference in printer setup makes the printer 1000 carry out the printing operation suitable for dye ink or pigment ink.

Moreover, there are more selections to be made for optimal printing performance, in addition to the selection to be internally made; for example, printing head type—printing head 1050 is dedicated to either dye ink or pigment ink.

The printing head 1050 (which hereinafter may be referred to as "recording head") is provided with the ROM 1051, which stores, as the apparatus type ID, the apparatus type data that indicate whether the printing head 1050 is a printing head dedicated to dye ink or a printing head dedicated to pigment ink. The apparatus type ID can be read by the CPU 1010.

As described above, the printing head 1050 is removably mountable, and is mounted on the printing head holder 1060 to be used for printing. A user can choose the apparatus type by mounting the printing head 1050 on the printing head holder 1060. In other words, a user can make the printer 1000 operate as a dye ink printer or a pigment ink printer, by mounting a printing head 1050 dedicated to dye ink or pigment ink, respectively. The sequence for determining the apparatus type of the printing head 1050 as the printing head 1050 is mounted in the printer 1000 will be described later.

The printer setup data storage portion 1022 stores a table which shows the correspondence between the apparatus type ID, as the data for determining whether the printer 1000 is to be operated as a dye ink printer or a pigment ink printer, and the apparatus setup data dependent on the aforementioned ink type.

The apparatus type data storage portion 1031 stores the selected apparatus type ID of the printer 1000. When the apparatus type has not been identified, such an ID that indicates that the apparatus type has not been identified is in the apparatus type data storage portion 1030.

The apparatus identification data storage portion 1021 stores the apparatus identification data. The apparatus identification data means the apparatus type (inclusive of apparatus specifications) data, manufacturer data, etc., necessary for differentiating the inkjet printer 1000 from the various peripheral devices connectable, or connected, to the host computer.

As described above, the host computer 1100 is compatible with the PnP of the USB. Thus, upon connection of the printer 1000 to the host computer 1100, the printer driver 1121 can be automatically installed by the OS of the PnP. The process for automatically installing the printer driver 1121 in the host computer 1100 is as follows.

Assuring that the host computer 1100 and printer 1000 are turned on, and the USB I/F 1180 is connected to the USB I/F 1040 with the USB cable 1200, as the printer 1000 is connected to the host computer 1100, the PnP module 1151 transmits a demand for apparatus identification data to the printer 1000 through the USB I/F 1180, in order to obtain the apparatus identification data. The demand for apparatus identification data is sent from the USB I/F 1180 of the host computer 1100 to the USB I/F 1040 of the printer 1000 through the USB cable 1200.

Upon reception of the demand for apparatus identification data through the USB I/F 1040, the CPU 1010 of the printer 1000 transmits the data, which match the received demand, to the host computer 1100 through the USB I/F 1040. The data sent to the host computer 1100 by the CPU 1010 in response to the demand from the CPU 1010 are the apparatus identification data which matches the apparatus type ID which has been sent from the apparatus identification data storage portion 1021 to the apparatus type data storage portion 1031 and stored therein. These apparatus type identification data sent to the host computer 1100 by the CPU 1010 are generated by the CPU 1010. The apparatus type identification data are sent from the USB I/F 1040 of the printer 1000 to the USB I/F 1040 of the host computer 1100 through the USB cable 1200.

Upon reception of the apparatus type identification data through the USB I/F 1180, the CPU 1110 of the host computer 1100 installs the printer driver 1120, which matches the received apparatus type identification data, by starting up the printer driver installer with the use of the PnP module 1151.

Next, referring to FIGS. 2 and 3, the sequence for determining the selected apparatus type for the printer 1000, and the communication control sequence will be described.

Figure 2:
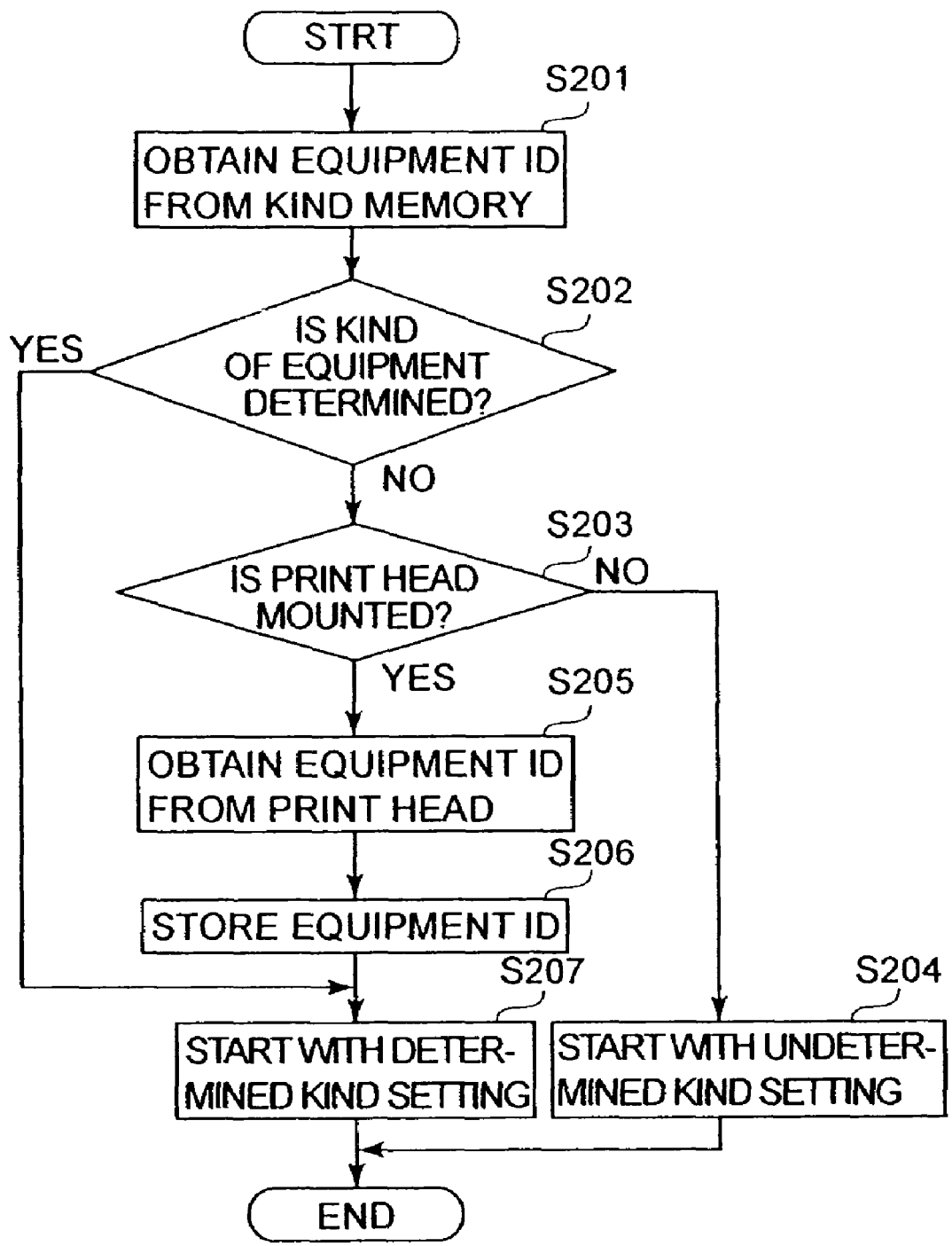
FIG. 2 is a flowchart of the apparatus identification sequence in the first embodiment of the present invention.

FIG. 2 is a flowchart of the sequence for determining the selected apparatus type for the printer 1000.

As the power source for the printer 1000 is turned on by a user, the CPU 1010 of the printer 1000 carries out various initialization processes. During this initialization period, the CPU 1010 obtains the apparatus type ID stored in the apparatus type data storage portion 1031 (Step S201), in order to initialize the printer 1000 in accordance with the apparatus type.

Next, in Step 202, the CPU determines, based an the contents of the apparatus type ID obtained in Step S201, whether or not the apparatus type has been identified. When the obtained apparatus type ID is not the ID that indicates that the apparatus type has not been identified, the CPU determines that the apparatus type has been identified, and advances to Step S207.

When the apparatus type ID obtained in Step S201 is the ID that indicates that the apparatus type has not been identified, the CPU determines that the apparatus type has not been identified, and advances to Step S203, in which it determines whether or not the printing head 1050 has been mounted on the printing head holder 1060.

In Step S203, if the CPU 1010 determines that the printing head has not been mounted, it advances to Step S204, in which it starts up the printer 1000 as an unidentified printer, without writing in the apparatus type data storage 1031.

On the other hand, if the CPU 1010 determines in Step S203 that the printing head 1050 has been mounted, it takes Step S205, in which it reads, through the system bus 1070 and printing head holder 1060, the apparatus type ID from the ROM 1051 mounted on the printing head 1050. Then, in Step S206, it writes the apparatus type ID obtained in Step S205 into the apparatus type data storage portion 1031. This establishes the type of the printer 1000.

Lastly, in Step S207, the CPU obtains the apparatus setup data from the apparatus setup data storage portion 1022, based on the obtained apparatus type ID. Obviously, when the obtained apparatus type ID is the dye ink printer ID, the obtained apparatus setup data are the data for setting up the printer 1000 so that the printer 1000 will properly operate as a dye ink printer, whereas when the obtained apparatus type ID is the pigment ink printer ID, the obtained apparatus setup data are the data for setting up the printer 1000 so that the printer 1000 will properly operate as a pigment ink printer. Then, when the obtained apparatus type ID is the dye ink printer ID, the CPU sets up the printer 1000 as a dye ink printer, using the obtained apparatus setup data, and starts it up, whereas when the obtained apparatus type ID is the pigment ink printer ID, the CPU sets up the printer 1000 as a pigment ink printer, using the obtained apparatus setup data, and starts it up.

Figure 3:
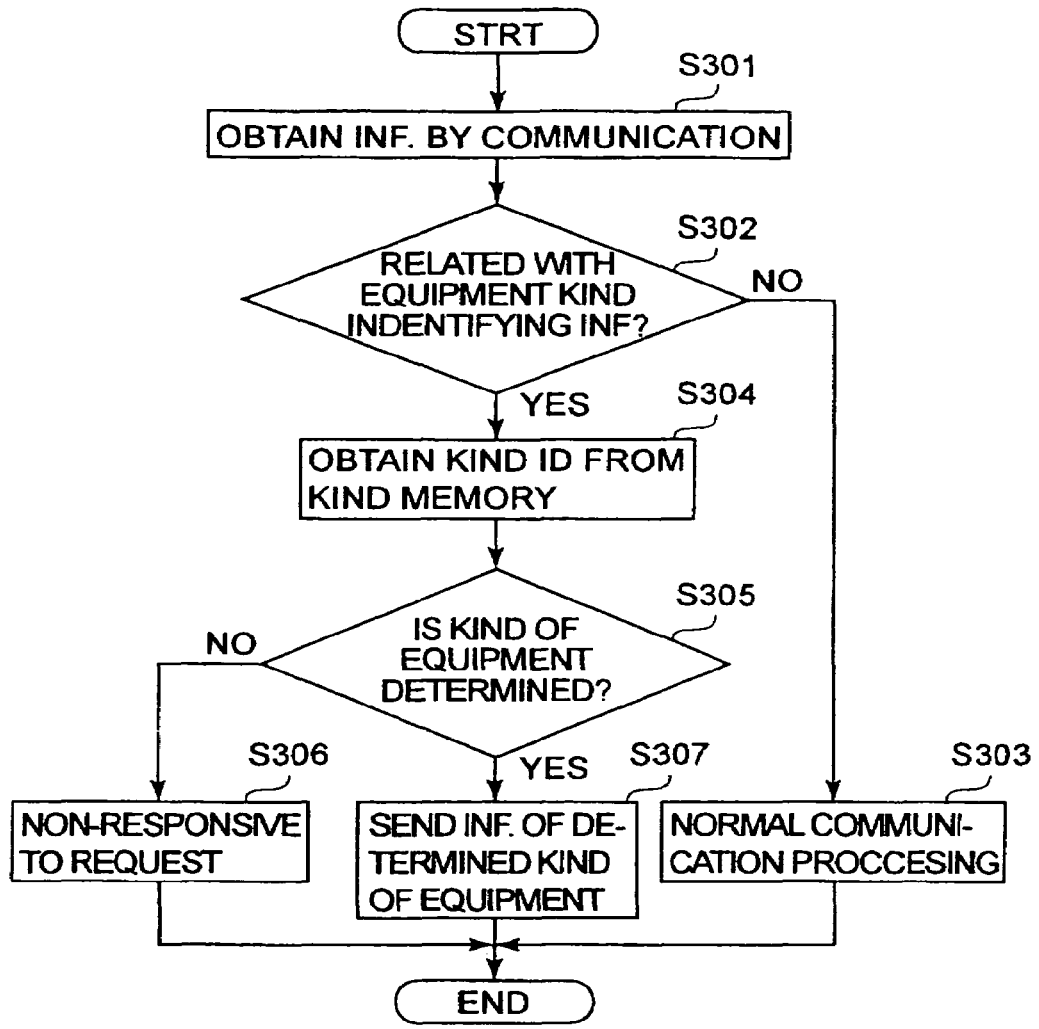
FIG. 3 is a flowchart of the communication control sequence in accordance with the present invention.

FIG. 3 is the communication control sequence in accordance with the present invention.

First, in Step S301, the CPU 1010 of the printer 1000 receives the communication data transmitted from the USB I/F 1180 of the host computer 1100 through the USB I/F 1200 of the printer 1000.

In the following Step S302, the CPU 1010 determines whether or not there is a demand for the apparatus identification data among the received data. When there is no demand for apparatus identification data among the communication data received in Step S302, the CPU 1010 advances to Step S303, in which it normally processes the received communication data.

On the other hand, when the CPU 1010 determines in Step S302 that there is a demand for the apparatus identification data, it obtains, in Step S304, the apparatus type ID stored in the apparatus type data storage portion 1021.

Then, the CPU determines in Step S305 whether or not the apparatus type has been identified, based on the contents of the apparatus type ID obtained in Step S304. When the apparatus type ID is the ID that indicates that the apparatus type has not been identified, the CPU determines that the apparatus type has not been identified, and advances to Step S306, in which it does not respond to the demand for the apparatus identification data from the host computer 1100. Then, it moves to the next communication step.

On the other hand, when the apparatus type ID is not the ID that indicates that the apparatus type has not been identified, the CPU determines that the apparatus type has been identified, and advances to Step S307, in which it generates the response which matches the demand for the apparatus type identification data, and sends the generated response to the host computer 1100 through the USB I/F 1040. More specifically, when the apparatus type ID obtained in Step S304 is the ID for a dye ink printer, the CPU reads the apparatus identification data for a dye ink printer from the apparatus identification data storage portion 1021, and generates the response, whereas when the apparatus type ID obtained in Step S304 is the ID for a pigment ink printer, the CPU reads the apparatus identification data for a pigment ink printer from the apparatus identification data storage 1021, and generates the response.

With the provision of the above described arrangement, the apparatus main assembly is enabled to vary the process which it carries out in response to the apparatus type identification data demanded by the host computer, depending on whether or not the apparatus type has been identified. In other words, if the apparatus type identification data are demanded when the apparatus type has not been identified, the apparatus main assembly does not respond to the demand, preventing thereby unnecessary setup files being generated in the host computer, whereas if the apparatus type identification data are demanded when the apparatus type has been identified, the apparatus main assembly responds to the demand, enabling the host computer to recognize the type of the apparatus connected thereto.

Embodiment 2

Next, the second embodiment of the present invention will be described with reference to the appended drawings.

Figure 4:
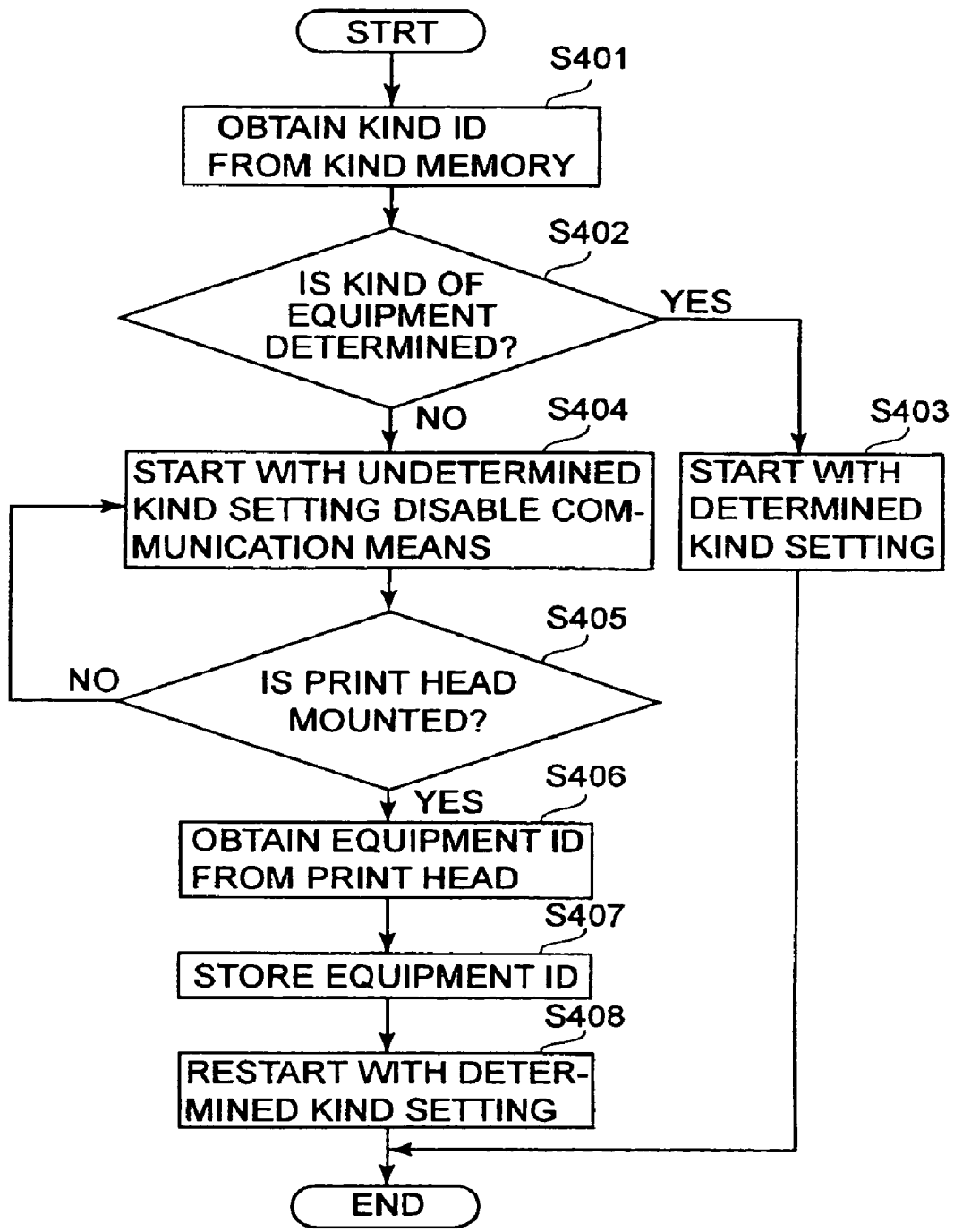
FIG. 4 is a flowchart of the startup sequence in the second embodiment of the present invention.

The printing apparatus and printing system in this embodiment are the same in structure as those in the first embodiment shown in FIG. 1. FIG. 4 is a flowchart of the sequence for starting up the printer 1000, which depicts the characteristic features of this embodiment.

In Step S401, the various processes for initializing the printer 1000 are carried out as soon as the printer 1000 is turned on. These initialization processes are carried out by the CPU 1010. That is, in Step S401, in order to initialize the printer 1000 in accordance with the apparatus type, the CPU 1010 obtains the apparatus type ID stored in the apparatus type data storage portion 1031.

Then, the CPU 1010 determines in Step S402 whether or not the apparatus type has been identified, based on the contents of the apparatus type ID obtained in Step S401.

If the contents of the obtained apparatus type ID do not indicate that the apparatus type has not been identified, the CPU determines that the apparatus type has been identified, and advances to Step S403, in which it obtains the apparatus setup data from the apparatus setup data storage portion 1022, based on the apparatus type ID obtained in the preceding step, that is, Step S401. Obviously, when the obtained apparatus type ID is the dye ink printer ID, the obtained apparatus setup data are the data for setting up the printer 1000 so that the printer 1000 will properly operate as a dye ink printer, whereas when the obtained apparatus type ID is the pigment ink printer ID, the obtained apparatus setup data are the data for setting up the printer 1000 so that the printer 1000 will properly operate as a pigment ink printer. Then, when the obtained apparatus type ID is the dye ink printer ID, the CPU sets up the printer 1000 as a dye ink printer, using the obtained apparatus setup data, and starts it up, whereas when the obtained apparatus type ID is the pigment ink printer ID, the CPU sets up the printer 1000 as a pigment ink printer, using the obtained apparatus setup data, and starts it up.

If the CPU determines in the following Step S402 that the apparatus type has not been identified, it starts up the printer 1000 as an unidentified printer. During this startup period, the communicating means (USB I/F 1040) is kept inoperable Also during this period, the initialization processes dependent on apparatus type are not carried, because the apparatus type has not been identified. Further, during this period, nothing is written into the apparatus type data storage portion 1031.

After the startup, the CPU 1010 determines in Step S405 whether or not the printing head 1050 has been mounted on the printing head holder 1060; the CPU makes this determination by monitoring the positioning of the printing head 1050 relative to the printing head holder 1060, through the system bus 1070. When the printing head 1050 has not been mounted on the printing head holder 1060, the CPU keeps the printer 1000 on standby until the printing head 1050 is mounted on the printing head holder 1060. While the printer 1000 is kept on standby, the CPU 1010 monitors the mounting of the printing head 1050 onto the printing head holder 1060, and also, allows the printer 1000 to carry out the ordinary operations within a limit.

If the CPU determines in Step S405 that the printing head 1050 has been mounted, it advances to Step S406, in which it reads the apparatus type ID from the ROM 1051 on the printing head 1050.

Then, in Step S407, the CPU 1010 writes the apparatus type ID it obtained in Step S406, into the apparatus type data storage portion 1031, which establishes the type of the printer 1000.

Next, in Step S408, the CPU 1010 obtains the apparatus setup data from the apparatus setup data storage portion 1022, based on the apparatus type ID obtained in Step S406, and restarts the printer 1000 as a printer of an identified type.

Obviously, when the obtained apparatus type ID is the dye ink printer ID, the obtained apparatus setup data are the data for setting up the printer 1000 so that the printer 1000 will properly operate as a dye ink printer, whereas when the obtained apparatus type ID is the pigment ink printer ID, the obtained apparatus setup data are the data for setting up the printer 1000 so that the printer 1000 will properly operate as a pigment ink printer. Then, when the obtained apparatus type ID is the dye ink printer ID, the CPU sets up the printer 1000 as a dye ink printer, using the obtained apparatus setup data, and starts it up, whereas when the obtained apparatus type ID is the pigment ink printer ID, the CPU sets up the printer 1000 as a pigment ink printer, using the obtained apparatus setup data, and starts it up.

In the above described second embodiment, if it is determined that the apparatus type has not been identified during the startup process, the printer 1000 is started up without activating the communicating means. Thus, even if the host computer is connected to the printer 1000, there will be no communication between the printer and host computer. Therefore, if a printer, the operational type of which has not been chosen, is connected to the host computer, not only are unnecessary apparatus setup files not generated in the host computer, but also there will be no unnecessary communications between the printer and host computer. Also in this second embodiment, the printer is restarted after the apparatus type is identified; in other words, the printer is started up as a printer of an identified type. Therefore, if the printer is connected to the host computer 1100 after the restarting of the printer 1000, a proper plug and play process is carried out.

Although not mentioned in the description of the preceding embodiments of the present invention, the printer 1000 may be provided with a means for matching the apparatus type against the type of the ink to be used, when identifying the type of the printer 1000. Further, in the preceding embodiments, the printing head 1050 having the ROM 1051 is used as the means for choosing the apparatus type for the printer 1000, which type the printer 1000 is going to be operated as. However, the means for choosing the apparatus type for the printer 1000 may be any means as long as it allows a user to choose the apparatus type for the printer 1000 before the printer 1000 is actually used. For example, the printer 1000 may be provided with a switch for choosing the apparatus type.

Embodiment 3

Next, the third embodiment of the present invention will be described with reference to the appended drawings.

Figure 9:
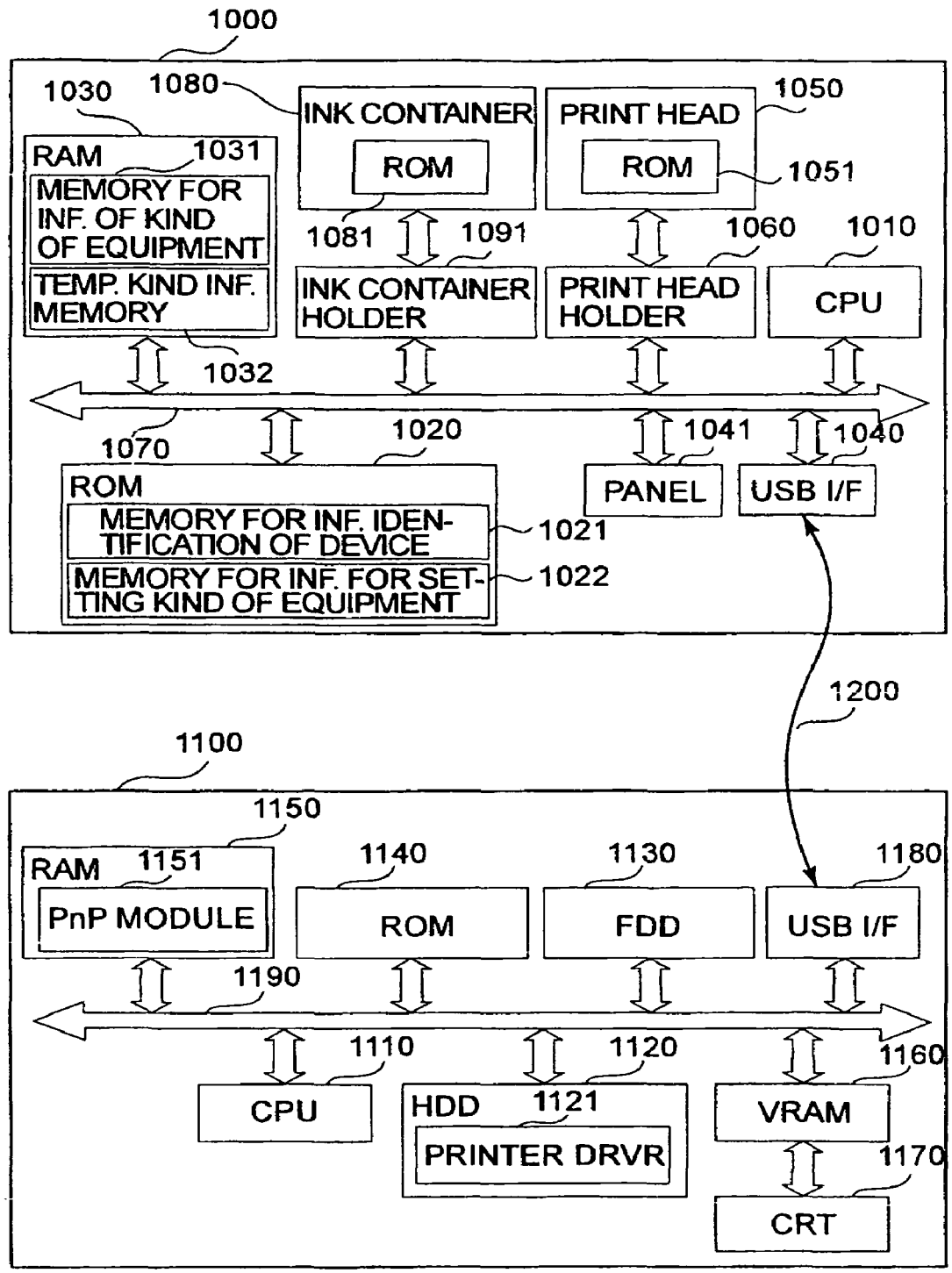
FIG. 9 is a block diagram of the printing system, to which the present invention is applicable, showing the structure thereof.

FIG. 9 is a block diagram of the printing system, in accordance with the present invention, made up of the printer 1000 and host computer 1100, showing the general structure thereof. In FIG. 9, the components similar in structure to those of the printing system shown in FIG. 1 are given the same referential symbols as those given in FIG. 1, respectively. The printing system in this embodiment shown in FIG. 9 is different from the printing system shown in FIG. 1 in that the printer 1000 in this embodiment is provided with an ink container holder 1090 on which an ink container 1080 is mounted, and a panel 1041 as a user I/F. The ink container 1080 is structured to be removably mountable on the ink container holder 1090. The ink container 1080 is a container for holding the ink to be supplied to the printing head 1050. As for the method of holding ink in the ink container 1080, one of various known methods may be employed. The structures of the components in this embodiment, which are similar to those in the first embodiment, will not be described in detail.

The printer 1000 in this embodiment can be operated either as a dye ink printer or a pigment ink printer, like the printers in the preceding embodiments. Here, a dye ink printer means a printing apparatus structured so that it can print using dye ink, and a pigment ink printer means a printing apparatus structured so that it can print using pigment ink. A dye ink printer is different from a pigment ink printer not only in the type of ink used for printing, that is, which ink is used for printing, dye ink or pigment ink, but also, in the printing head driving condition, image processing method, etc. The printer 1000 in this embodiment can be set up either as a dye ink printer or a pigment ink printer, through the sequence for setting up the printer 1000, which will be described later. In other words, the difference in the sequence for setting up the printer 1000 makes the printer 1000 carry out a printing operation in a manner suitable for either dye ink or pigment ink.

The ink is held in the ink container 1080. The ink container 1080 is provided with a ROM 1081, which stores the apparatus type ID, that is, a set of data which indicate whether the ink container 1080 is an ink container for a dye ink printer (dye ink) or an ink container for a pigment ink printer (pigment ink). The apparatus type ID in the ROM 1081 is readable by the CPU 1010 of the printer 1000.

Next, referring to FIG. 5, the sequence in this embodiment will be described.

Figure 5:
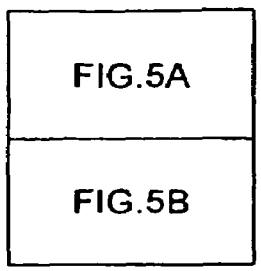
FIG. 5 is a flowchart of the apparatus identification sequence in the third embodiment of the present invention.
Figure 5A:
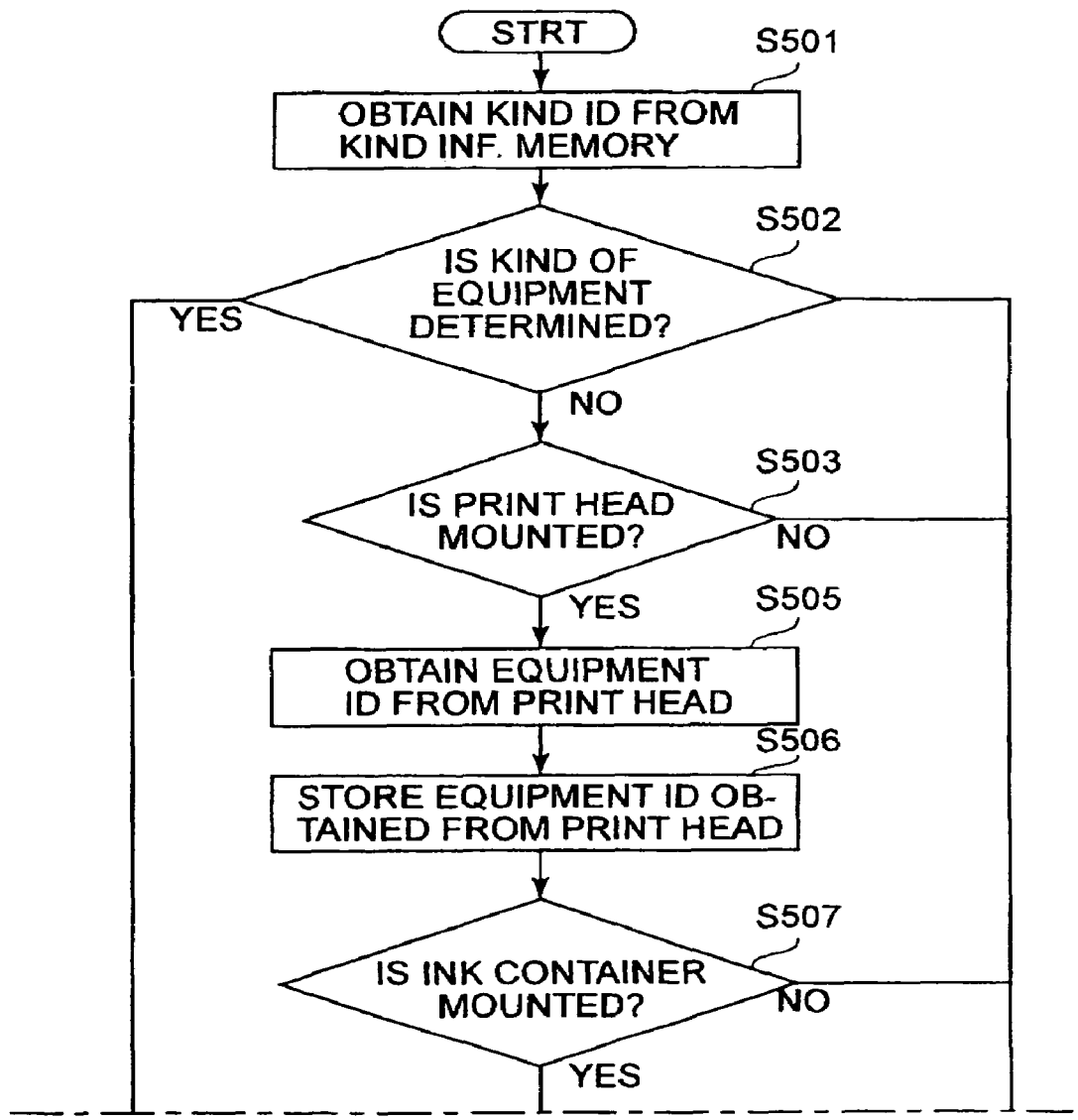
Figure 5B:
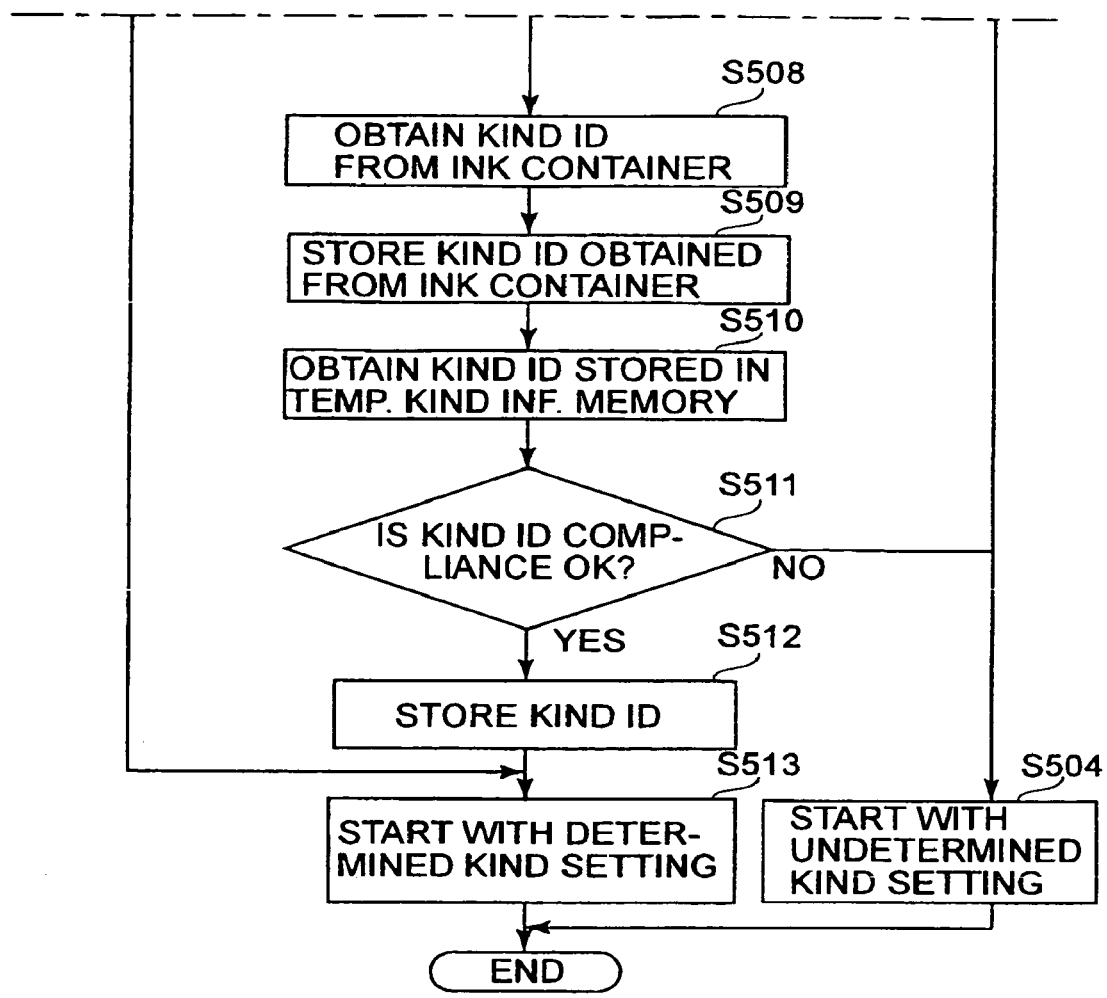

FIG. 5 shows the sequence in this embodiment for identifying the type of the printer 1000. This sequence shown in FIG. 5 is for matching the type of the ink with the type of the recording head of the printer 1000. The type of the ink to be used can be identified by reading the ID from the ROM 1081, as a storage means, of the ink container.

As the printer 1000 is turned on by a user, the sequence is initiated. That is, in Step S501, the printer 1000 is initialized by the CPU 1010 of the printer 1000. During this initialization period, various processes for initializing the printer 1000 are carried out. Also during this initialization period, the CPU 1010 obtains the apparatus type ID stored in the apparatus type data storage portion 1031, in order to initialize the printer 1000 in accordance with the apparatus type.

The following Steps S502-S506, and Step S513, are the same as Steps S202-S206, and Step S207, shown in FIG. 2, and therefore, these steps will not be described in detail. In Steps S502-S506, the CPU 1010 determines whether or not the apparatus type has been identified. If the CPU 1010 determines that the apparatus type has not been identified, it determines whether or not the printing head has been mounted. If it determines that the printing head has been mounted, it obtains the apparatus type ID from the printing head, and stores the obtained apparatus type ID, whereas when it determines that the printing head has not been mounted, it starts up the printer as a printer of an unidentified type. These steps are the same as those in the first embodiment described with reference to FIG. 2.

After storing, in Step S506, the apparatus type ID obtained from the printing head, the CPU 1010 determines in Step S507 whether or not the ink container 1080 has been mounted on the ink container holder 1090. If it determines that the ink container 1080 has not been mounted, it determines that the apparatus type could not be identified, and advances to Step S504, in which it starts up the printer as a printer of an unidentified type.

If the CPU 1010 determines in Step S507 that the ink container 1080 has been mounted, it advances to Step S508, in which it reads the apparatus type ID from the ROM 1081 on the ink container 1080, through the system bus 1070 and ink container holder 1090. Then, in the following Step S209, it writes the apparatus type ID obtained in Step S508, into the ink container region of the temporary storage portion 1032 for the apparatus type ID.

Next, the CPU 1010 obtains, in Step S510, the apparatus type ID having been obtained from the printing head 1050 and ink container 1080 and stored in the temporary storage portion 1032 for printer type ID, and advances to Step S511, in which it determines whether or not the apparatus type ID obtained from the printing head 1050 matches the apparatus type ID obtained from the ink container 1080. If the apparatus type ID from the recording head 1050 matches the apparatus type ID from the ink container 1080, that is, both are of the dye ink type, or the pigment type, the CPU 1010 determines that the printing head 1050 and ink container 1080 match with each other, whereas if the combination of the apparatus type ID from the recording head 1050 and the apparatus type ID from the ink container 1080 is not the above-described combination, the CPU 1010 determines that the printing head 1050 and ink container 1080 do not match with each other.

If the CPU 1010 determines in Step S511 that the printing head 1050 does not match the ink container 1080, it moves to Step S504, in which it carries out the above described process. If it determines in Step S511 that the recording head 1050 matches the ink container 1080, it advances to Step S512, in which it obtains the apparatus type ID stored in the temporary storage portion 1032 for the apparatus type data, and writes the data into the apparatus type data storage portion 1031, ending the process for determining the type of the printer 1000 connected to the host computer. In this case, the apparatus type ID from the recording head 1050 and the apparatus type ID from the ink container 1080, stored in the temporary storage portion 1032 for the apparatus type are identical.

Next, the CPU obtains, in Step 13, the printer setup data from the printer setup data storage portion 1022, based on the obtained apparatus type ID. Obviously, when the obtained apparatus type ID is the dye ink printer ID, the obtained apparatus setup data are the data for setting up the printer 1000 so that the printer 1000 will properly operate as a dye ink printer, whereas when the obtained apparatus type ID is the pigment ink printer ID, the obtained apparatus setup data are the data for setting up the printer 1000 so that the printer 1000 will properly operate as a pigment ink printer. Then, when the obtained apparatus type ID is the dye ink printer ID, the CPU sets up the printer 1000 as a dye ink printer, using the obtained apparatus setup data, and starts it up, whereas when the obtained apparatus type ID is the pigment ink printer ID, the CPU sets up the printer 1000 as a pigment ink printer, using the obtained apparatus setup data, and starts it up.

The communication sequence in this embodiment is the same as that in the first embodiment described with reference to FIG. 3. That is, if there is a demand from the host computer 1100 for the apparatus type identification data, the CPU 1010 determines whether or not the apparatus type has been identified, and caries out the processes relevant to the result of the identification. Here, like in the first embodiment, if the CPU 1010 determines that the apparatus type has been identified, it transmits to the host computer 1100 the printer identification data (confirmed apparatus type), whereas if it determines that the apparatus type has not been identified, it does not respond to the demand for the apparatus type identification data.

As described above, in the case of the printer 1000 structured so that the ink container for holding ink is removably mountable, it is determined whether or not the printing head and the ink type match with each other, and the apparatus type is identified only after an ink container, containing the ink, the type of which matches the apparatus type ID from the printing head, is mounted.

Embodiment 4

Next, the fourth embodiment of the present invention will be described in detail with reference to the appended drawings.

The structures of the printer and printing system in this embodiment are the same as those in the third embodiment shown in FIG. 9, and their detailed descriptions will be not be given here.

This embodiment is the combination of the second embodiment described above with reference to FIG. 4, and a setup in which it is determined whether or not the ink to be used matches the printing head, and the apparatus type is confirmed only when the ink to be used matches the printing head. This embodiment is the same as the second embodiment in that if it is determined that the apparatus type has not been identified, the communicating means is rendered inoperable.

Figure 6:
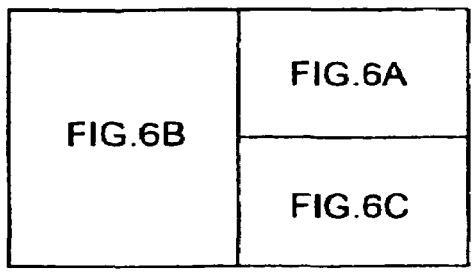
FIG. 6 is a flowchart of the startup sequence in the fourth embodiment of the present invention.
Figure 6A:
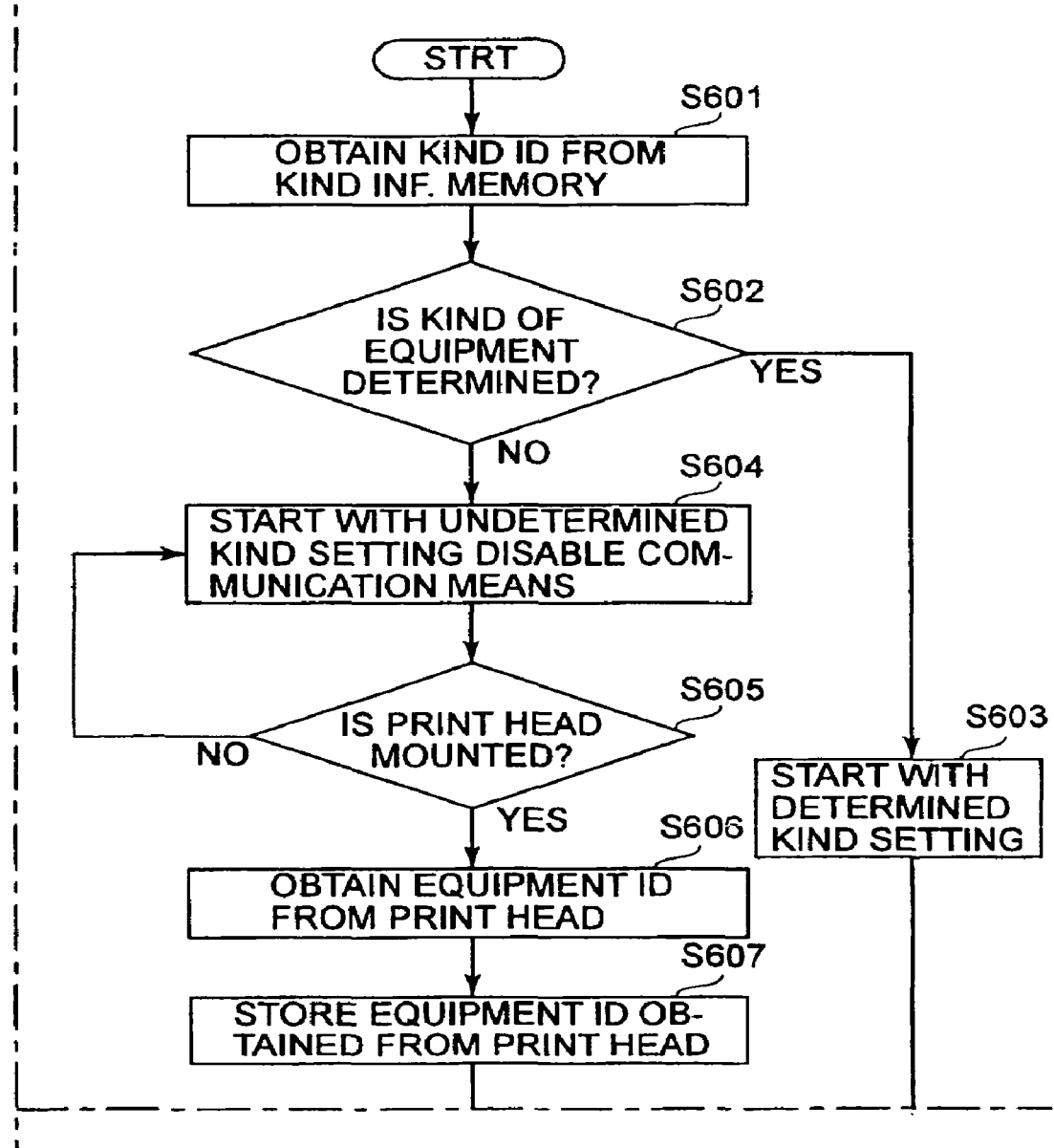
Figure 6B:
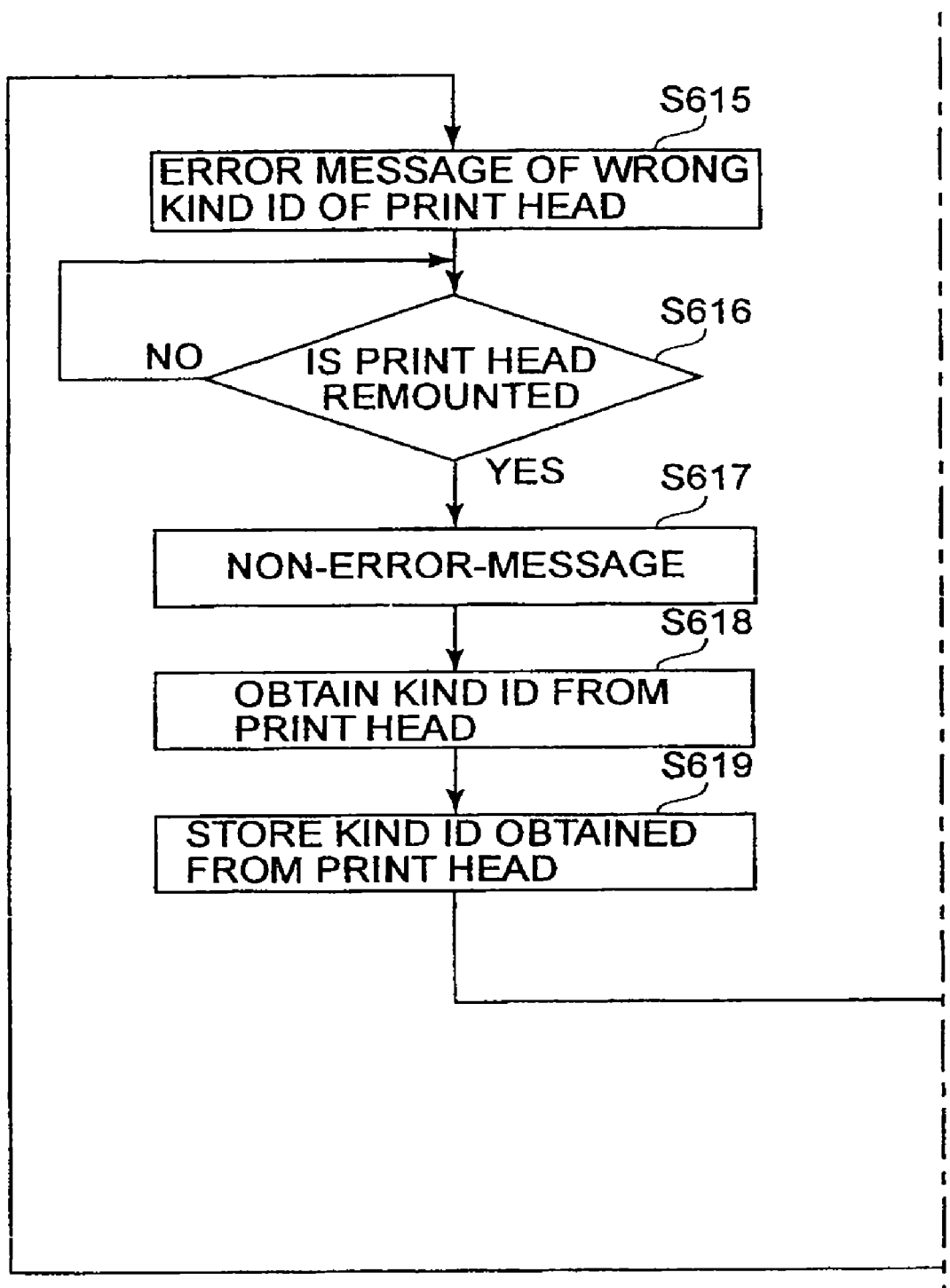
Figure 6C:
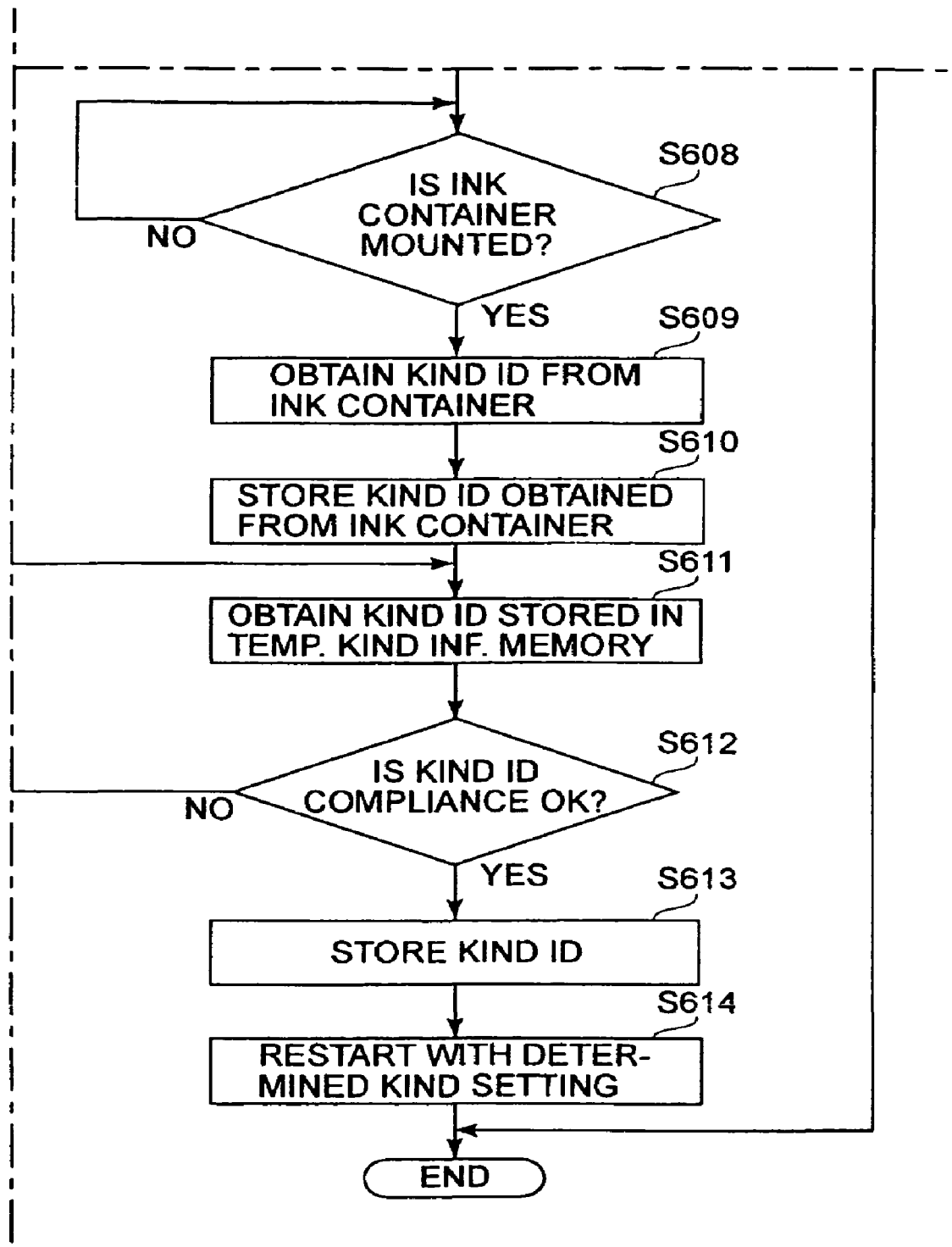

FIG. 6 is a flowchart of the sequence for starting up the printer 1000, which depicts the characteristic features of this embodiment.

Steps S601-S607 shown in FIG. 6 are the same as Steps 401-407 shown in FIG. 4, and therefore, these steps will be not described.

After storing, in Step S607, the apparatus type ID obtained from the printer head, the CPU 1010 determines in Step S608 whether or not the ink container has been mounted. If the CPU 1010 determines in Step S608 that the printing head has not been mounted, it keeps the printer 1000 on standby until the ink container 1080 is mounted on the ink container holder 1090. While the printer 1000 is kept on standby, the mounting of the ink container 1080 on the ink container 1090 is monitored, and the ordinary printing operations are carried out within a limit.

If the CPU 1010 determines in Step S608 that the printing head has been mounted, or if the ink container 1080 is mounted during the above described standby period, the CPU 1010 advances to Step S609, in which it reads the apparatus type ID from the ROM 1081 on the ink container 1080. In the following Step S410, the CPU 1010 writes the apparatus type ID obtained in Step S409, into the ink container data region of the temporary storage portion 1032 for apparatus type ID.

Next, the CPU 1010 obtains, in Step S411, the apparatus type ID obtained from the recording head and stored in the temporary storage portion 1032 for apparatus type data, and the apparatus type ID obtained from the ink container and stored in the temporary storage portion 1032 for apparatus type data, and determines, in Step S412, whether or not the printing head 1050 and ink container 1080 match in terms of the apparatus type. If the CPU 1010 determines in Step S412 that the apparatus type ID obtained from the printing head 1050 and the apparatus type ID obtained from the ink container 1080, do not match, the CPU 1010 advances to Step S415.

In Step S615, the CPU 1010 displays on the panel 1041 shown in FIG. 9, a message informing a user that the printing head in the printer 1000 needs to be replaced with a correct one. Although, in this embodiment, the message indicating the need for printing head replacement is displayed, a message informing a user that the printing head and ink container do not match may be displayed.

After displaying the message in Step S615, the CPU 1010 determines in Step S616 whether or not another printing head 1050 has been mounted on the printing head holder 1060. The CPU 1010 continuously monitors the printing head holder 1060 until another printing head 1050 is mounted on the printing head holder 1060, while allowing the normal printing operations to be carried out within a limited.

As the CPU 1010 determines in Step S616 that another printing head 1050 has been mounted. It advances to Step S617, in which it erases the message displayed in Step S615.

Then, the CPU 1010 reads the apparatus type ID from the ROM 1051 on the printing head 1050 (Step S618), and writes the obtained apparatus type ID into the printing head region of the temporary storage portion 1032 for apparatus type data (Step S619). In this case, the apparatus type ID in the storage portion 1032, that is, the apparatus type ID which was stored In the storage portion 1032 in Step 607, is erased because the fresh apparatus type ID is written into the same region as the old apparatus type ID. After obtaining the apparatus type ID from the replacement printing head by carrying out the above described Steps 615-619, the CPU 1010 advances to Step S612, in which it again determines whether or not the apparatus type ID obtained from the printing head and the apparatus type ID obtained from the ink container for containing ink match.

If the CPU 1010 determines in Step S612 that the printing head 1050 matches the ink container, it advances to the next step, that is, Step S613, in which it reads the apparatus type ID stored in the temporary storage portion 1032 for apparatus type data, and write the apparatus type ID into the apparatus type data storage portion 1031, establishing thereby the apparatus type of the printer 1000.

Next, in Step S614, the CPU 1010 obtains the printer setup data from the printer setup data storage portion 1022, based on the apparatus type ID stored in Step S613, and restarts the printer 1000 as a printer of an identified type.

When the obtained apparatus type ID is the dye ink printer ID, the obtained apparatus setup data are the data for setting up the printer 1000 so that the printer 1000 will properly operate as a dye ink printer, whereas when the obtained apparatus type ID is the pigment ink printer ID, the obtained apparatus setup data are the data for setting up the printer 1000 so that the printer 1000 will properly operate as a pigment ink printer. Then, the printer 1000 is set up in accordance with the obtained printer setup data, and is started up.

For example, if the printing head dedicated to dye ink and an ink container containing pigment ink are mounted in the main assembly of a printer, the printing head and ink container do not match, and therefore, the CPU cannot determine which apparatus type a user has chosen, the dye ink type or pigment ink type. Thus, the use is required to replace the printing head 1050 or ink container 1080 so that the printing head 1050 and ink container 1080 match.

Incidentally, as the ink container 1080 is mounted into the printer 1000, the ink in the ink container 1080 automatically seeps into the ink container holder 1090. Therefore, in order to replace the mounted ink container 1080 with an ink container (1080) of a different type (correct type), the ink having seeped into the ink container holder 1090 must be removed to prevent the ink from the second ink container from mixing with the ink from the first ink container. The essential difference between a dye ink printer and a pigment ink printer is the difference in the type of the ink they use. Therefore, it is quite rare for a user to mount a wrong ink container (1080) into the printer 1000. Thus, in this embodiment, the printer 1000 is structured so that if the apparatus type ID stored in the printing head 1050 does not match the apparatus type ID stored in the ink container 1080, a user is suggested, in Step S615, to replace the printing head 1050 with a correct one.

In the above described third and fourth embodiments, nothing was mentioned about the number of ink containers. However, the present invention is also applicable to a printer which employs a plurality of ink containers to print an image. In the case of such a printer, it is presumed that each of the ink containers mounted in the printer is provided with a ROM which stores an apparatus type ID. The CPU of the printer obtains the apparatus type IDs from all the ink containers, and determines whether or not all the apparatus type IDs from the ink containers match the apparatus types ID from the recording heads. Further, the present invention is also applicable to a printer which employs a plurality of printing heads. Also in the case of such a printer, the setup for matching the apparatus type IDs is the same as that for a printer which employs a plurality of ink containers.

Embodiment 5

Next, the fifth embodiment of the present invention will be described in detail with reference to the appended drawings.

The structure of the printing system in this embodiment is the same as that in the preceding embodiments described with reference to FIG. 9, and therefore, will not be described in detail here.

The printer 1000 in this embodiment is operable either as a dye ink printer or a pigment ink printer, as are the printers in the preceding embodiments. Further, an ink container 1080 for holding ink is provided with a ROM 1081, in which its ID inclusive of its ink type, that is, the data indicating whether the ink container is for ink (dye ink) for a dye ink printer or ink (pigment ink) for a pigment ink printer, is stored. The apparatus type portion of the ink container ID in the ROM 1081 is readable by the CPU 1010 of the printer 1000. Also as in the preceding embodiments, the ink container 1080 is removably mountable, and is mounted on the ink container holder 1060. The operational mode in terms of apparatus type, which the printer 1000 is going to be operated as, is decided by the mounting of the ink container 1080 on the ink container holder 1060; a user is enabled to decide in which operational mode the printer 1000 will be operated. In other words, a user can make the printer 1000 operate as a pigment ink printer, by choosing (mounting) an ink container for pigment ink.

Figure 7:
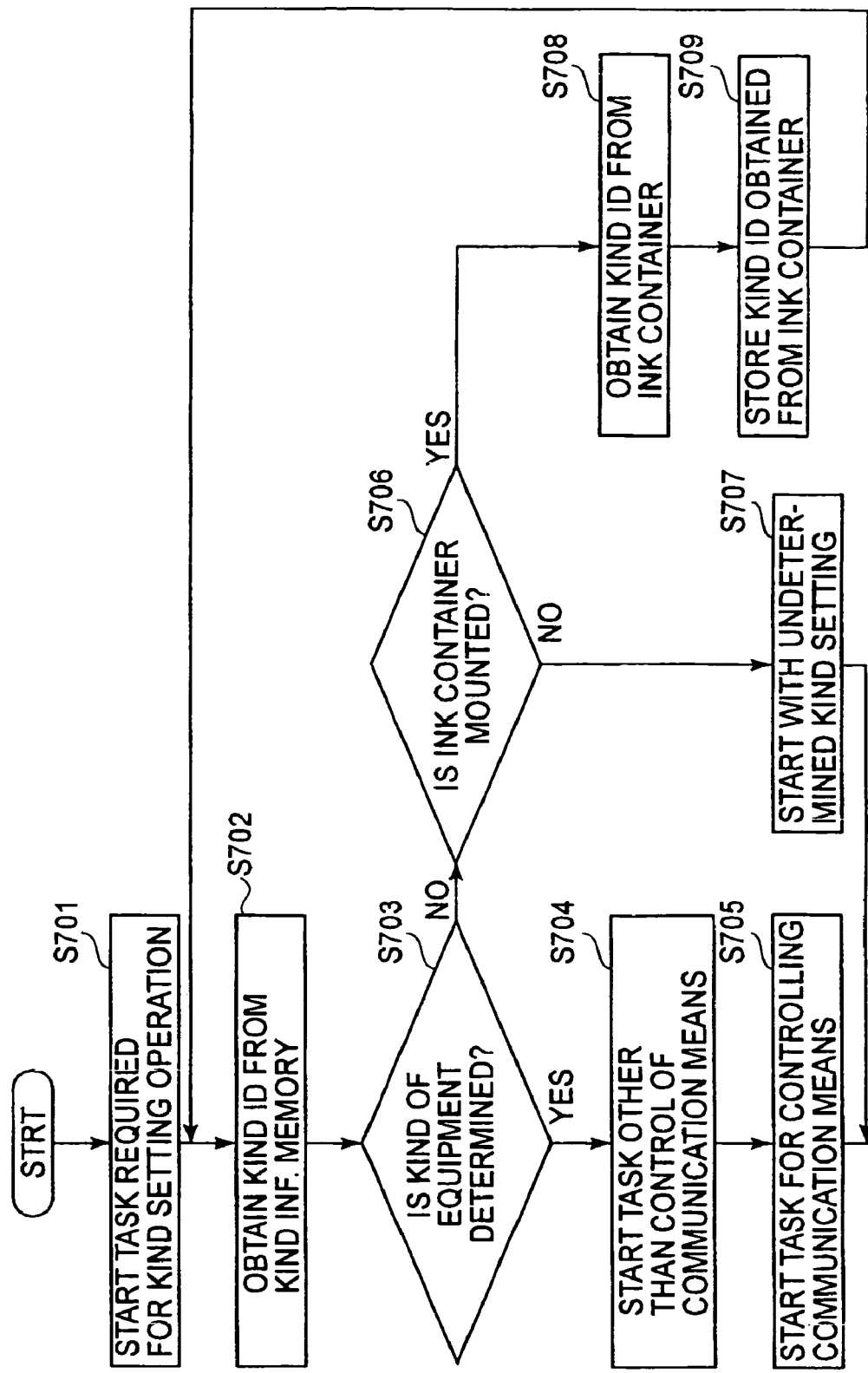
FIG. 7 is a flowchart of the apparatus identification sequence in the fifth embodiment of the present invention.

Next, referring to FIG. 7, the sequence in this embodiment for identifying the apparatus type of the printer 1000 will be described.

As the printer 1000 is turned on by a user, the sequence is started. In Step S701, the various processes for initializing the printer 1000 are carried out by the CPU 1010 of the printer 1000. In Step S701, only the processes necessary to identify the apparatus type are started up. The processes necessary to identify the apparatus type include the process for obtaining the apparatus type ID from the ink container 1080, the process for controlling the printer status, and the process for displaying a control panel, as a user I/F, on the monitor of the printer 1000.

Next, in Step S702, the CPU 1010 obtains the apparatus type ID stored in the apparatus type data storage portion 1031.

Then, in Step S703, the CPU 1010 determines whether or not the apparatus type has been identified, based on the apparatus type ID obtained in the preceding step, or Step S702.

If the apparatus type ID does not show that the apparatus type has not been identified, the CPU 1010 determines that the apparatus type has been identified, and advances to Step S704, in which it obtains printer setup data from the printer setup data storage portion 1022, based on the apparatus type ID. Then, the CPU 1010 sets up the printer 1000 in accordance with the obtained apparatus setup data. In other words, if the obtained apparatus type is the dye ink type, the CPU 1010 sets up the printer 1000 as a dye ink printer, whereas if the obtained apparatus type is the pigment ink type, it sets up the printer 1000 as a pigment ink printer. Then, the CPU starts up the tasks, except for the task for controlling the communicating means. Next, in Step S705, the CPU starts up the task for controlling the communicating means.

If the apparatus type ID obtained in S702 is shows, in Step S703, that the apparatus type has not been identified, the CPU 1010 determines that the apparatus type has not been identified, and advances to Step S706, in which It determines whether or not the ink container 1080 has been mounted on the ink container holder 1060. If the CPU determines in Step S706 that the ink container 1080 has not been mounted, it advances to Step S707, in which it starts up the remaining tasks, presuming that the apparatus type has not been identified. In Step S707, nothing is written into the apparatus type data storage portion 1031.

If the CPU 1010 determines in Step S706 that the ink container 1080 has been mounted, it advances to Step 708, in which it reads the apparatus type ID from the Ink container 1081 on the ink container 1080, through the system bus 1070 and ink container holder 1060. Then, the CPU 1010 advances to Step S709, in which it writes the apparatus type ID obtained in Step 708, into the apparatus type data storage portion 1031, and returns to Step S702, in which it carries out the above described process. This process establishes the apparatus type of the printer 1000.

The communication controlling sequence in this embodiment is the same as that in the first embodiment described with reference to FIG. 3. That is, if there is a demand from the host computer 1100 for the apparatus type identification data, the CPU 1010 determines whether or not the apparatus type has been identified, and it carries out appropriate processes in accordance with the determination. As in the first embodiment, if the apparatus type has been identified, the CPU 1010 transmits the apparatus type identification data of the identified apparatus type, to the host computer 1100, whereas if the apparatus type has not been identified, the CPU 1010 does not respond to the demand for the apparatus type identification data.

As described above, in this embodiment, the printer 1000 is structured so that the ink container(s) for holding ink is removably mountable, and the apparatus type is established in accordance with the apparatus type ID obtained from the mounted ink container. Further, the communication between the printer 1000 and external devices, such as a host computer, is made possible as the apparatus type, which the printer is operated as, is identified. In other words, until the apparatus type is established, there will be no communication between the printer and host computer even if the printer is connected to the host computer. Thus, even if the host computer transmits to the printer the demand for the apparatus type, the data regarding the apparatus type will not be sent to the host computer, unless the apparatus type is identified.

Embodiment 6

Next, the sixth embodiment of the present invention will be described with reference to the appended drawings.

The printing system in this embodiment is the same as that in the preceding embodiments described with reference to FIG. 9, and therefore, will not be described in detail here.

Figure 8:
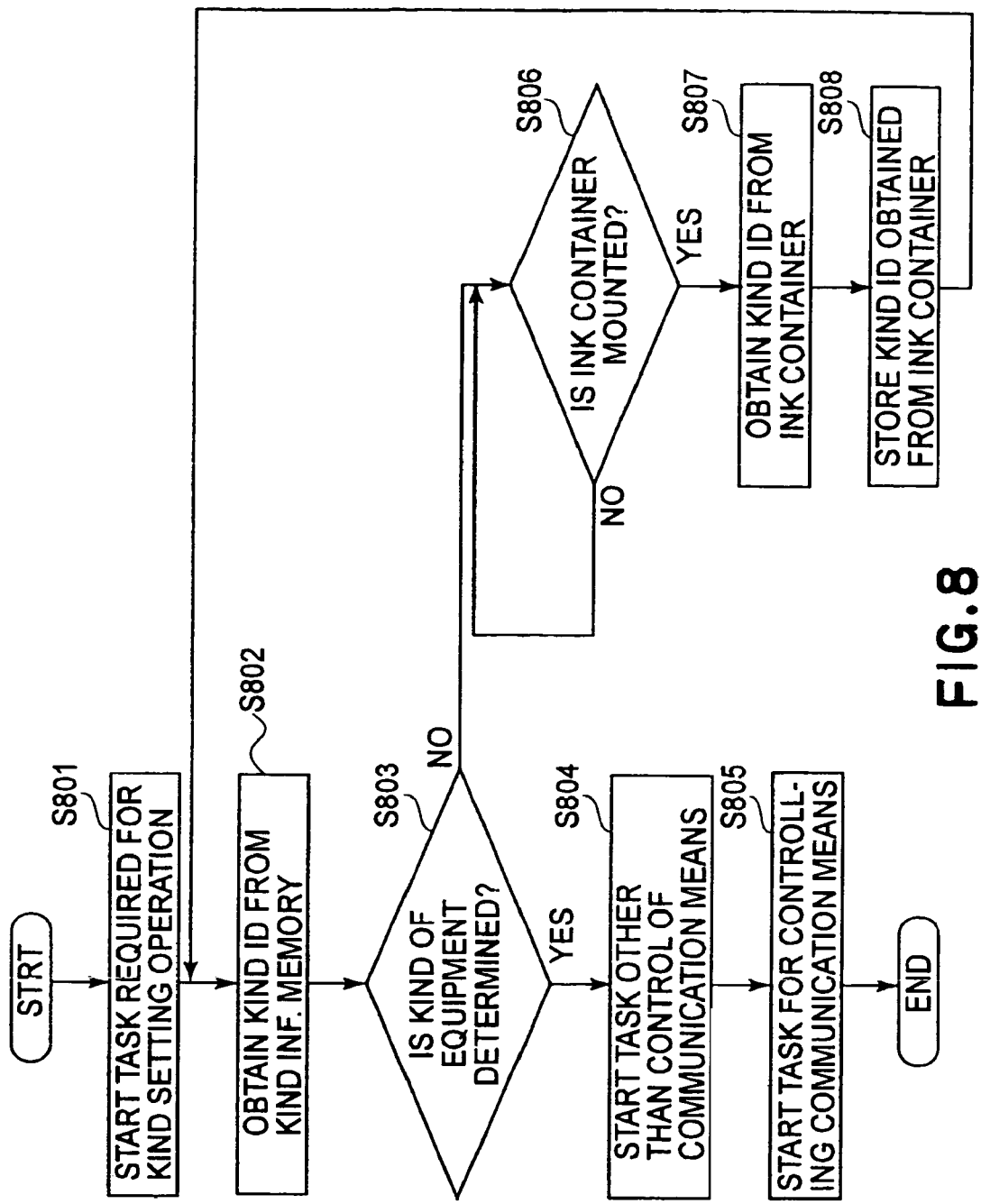
FIG. 8 is a flowchart of the startup sequence in the sixth embodiment of the present invention.

FIG. 8 is a flowchart for describing the characteristic features of this embodiment, in particular, the process for starting up the printer 1000.

As the printer 1000 is turned on by a user, the sequence is started. In Step S801, the various processes for initializing the printer 1000 are carried out by the CPU 1010 of the printer 1000. In Step S801, only the processes necessary to identify the apparatus type of the printer 1000, are started up. The processes necessary to identify the apparatus type include the process for obtaining the apparatus type ID from the ink container 1080, the process for controlling the printer status, and the process for displaying a control panel as a user I/F, on the monitor of the printer 1000.

Next, in Step S802, the CPU 1010 obtains the apparatus type ID stored in the apparatus type data storage portion 1031. Then, in Step S803, the CPU 1010 determines whether or not the apparatus type has been identified, based on the apparatus type ID obtained in the preceding step, or Step S802.

If the apparatus type ID does not show that the apparatus type has not been identified, the CPU 1010 determines that the apparatus type has been identified, and advances to Step S804, in which it obtains printer setup data from the printer setup data storage portion 1022, based on the apparatus type ID. Then, the CPU 1010 sets up the printer 1000 in accordance with the printer setup data obtained in Step S804. In other words, if the obtained apparatus type is the dye ink type, the CPU 1010 sets up the printer 1000 as a dye ink printer, whereas if the obtained apparatus type is the pigment ink type, it sets up the printer 1000 as a pigment ink printer. Then, the CPU starts up the tasks, except for the task for controlling the communicating means. Next, in Step S805, the CPU starts up the task for controlling the communicating means.

If the CPU 1010 determines in Step S803 that the apparatus type has not been identified, it advances to Step S806, in which it determines, through the system bus 1070, whether or not the ink container 1080 has been mounted on the ink container holder 1060. If the CPU determines in Step S806 that the ink container 1080 has not been mounted, it keeps the printer 1000 on standby until the ink container 1080 is mounted on the ink container holder 1060. This process of keeping the printer 1000 on standby includes the sub-process for monitoring the mounting of the ink container 1080 onto the ink container holder 1060. Further, while keeping the printer 1000 on standby, the CPU 1010 allows the printer 1000 to perform ordinary routines within a limit.

If the CPU 1010 determines in Step S803 that the ink container 1080 has been mounted, it advances to Step S807, in which reads the apparatus type ID from the ROM 1081 on the ink container 1080, and advances to Step S808, in which it writes the apparatus type ID obtained in the preceding step, that is, Step S807, Into the apparatus type data storage portion 1031. Then, the CPU 1010 returns to Step 802, in which it carries out the above described tasks. This establishes the apparatus type, which the printer 1000 is to be operated as.

As described above, in this embodiment, a startup sequence such as the above described one is used to start up the printer 1000, the printer 1000 being connected to the host computer 1100 with the USB cable 1200. Therefore, the data regarding the apparatus type of the printer 1000 connected to the host computer 1100 can be obtained without restarting up the printer 1000 after the apparatus type is identified. Thereafter, the printer driver 1121 suitable for the apparatus type of the printer 1000 is automatically installed into the host computer 1100.

Regarding the above-described fifth and sixth embodiments, the sequence may be modified so that the apparatus type is identified after the matching of the printing head and ink to be used. In the case of a printer structured so that a plurality of ink containers are mountable therein, the apparatus type is desired to be identified after all the printing heads are matched with correct ink containers. Although in the preceding embodiments, the ink container 1080 provided with the ROM 1081 is used as the means for selecting the apparatus type, other means may be used as long as they allow a user to select the apparatus type which the printer 1000 is to be operated as, before starting the actual printing process. For example, a removably mountable printing head may be used, or the printer 1000 may be provided with an apparatus type selection switch.

Also in the preceding embodiments, the apparatus type, which the printing apparatus is to be operated as, was identified, based on the ID obtained from the ROM 1051 of the printing head 1050, or the ID obtained from the ROM 1081 of the ink container 1080. However, the data to be obtained for apparatus type identification do not need to be limited to specific data such as IDs. For example, the apparatus type can be identified by determining whether the printing head 1050 is a pigment ink head or a dye ink head, or whether the ink is pigment ink or dye ink. For example, a printing head and ink container may be provided with an identification resister or an identification bar code, from which the apparatus type can be identified. In other words, the present invention is applicable to any printing apparatus structured so that the apparatus type, which the printing apparatus is to be operated as, can be identified with reference to the first printing head or ink container mounted in the printing apparatus.

While the invention has been described with reference to the structures disclosed herein, it is not confined to the details set forth, and this application is intended to cover such modifications or changes as may come within the purposes of the improvements or the scope of the following claims.

What is claimed is:

1. A printing apparatus for effecting printing with a recording head which is mountable thereto to eject ink, said apparatus including communicating means for communication with an information processing apparatus, said apparatus comprising:

a controller for determining a kind of device among a plurality of kinds in response to a predetermined operation for setting the kind of the printing apparatus, and being operable for the determined kind;

a discriminator for discriminating whether the kind of device is determined or not;

a detector for detecting whether or not the recording head is mounted;

a communication controller for controlling communication with the information processing apparatus by the communicating means and transmitting information based on the kind of device to the information processing apparatus in accordance with a result of discrimination of said discriminator; and a storing portion for storing the information to determine the kind of device, wherein in response to detection of mounting of the recording head, said controller causes said storing portion to store information indicating the kind of ink to be ejected from the mounted recording head stored in the mounted recording head, and said discriminator discriminates that the kind of device is determined when said storing portion stores the information indicating the kind of ink and determines that the kind of device is not determined when said storing portion does not store the information indicating the kind of ink, and wherein when said discriminator discriminates that the kind of device is not determined, said communication controller prohibits the communicating means from communicating with the information processing apparatus, and when said discriminator discriminates that the kind of device is determined, said communication controller permits the communicating means to communicate with the information processing apparatus.

2. An apparatus according to claim 1, wherein when said discriminator discriminates that the kind of device is not determined, said communication controller effects control so as not to respond to a command inquiring information on the kind of device received from the information processing apparatus.

3. An apparatus according to claim 1, wherein said controller determines the kind of device of the printing apparatus by reading the information indicating the kind of ink to be ejected from the mounted recording head from memory provided in the recording head in response to an operation of mounting the recording head to the printing apparatus.

4. An apparatus according to claim 1, wherein the recording head is an ink jet head for effecting the recording by ejecting ink, and the printing apparatus includes an ink container mounting portion for detachably mounting an ink container containing the ink, and wherein said controller determines the kind of the printing apparatus by reading the information indicating the kind of ink to be ejected from the mounted recording head stored in memory provided in the ink container mounted to said ink container mounting portion.

5. An apparatus according to claim 1, wherein the recording head is an ink jet head for effecting the recording by ejecting ink, and the printing apparatus includes an ink container mounting portion for detachably mounting an ink container containing the ink, and wherein said controller checks correspondence between information on the kind of ink to be ejected read out of a head memory provided in the recording head mounted thereto and information on the kind of ink to be ejected read out of a container memory provided in the ink container mounted to said ink container mounting portion, and determines the kind of device when the kinds of ink are discriminated as corresponding to each other.

6. An apparatus according to claim 1, wherein said storing portion stores setting information corresponding to kinds of devices with which the printing apparatus is compatible, wherein said controller reads the setting information corresponding to the determined kind of device out of said storing portion, and controls the printing apparatus so as to operate as the kind of device determined in accordance with the setting information.

7. An apparatus according to claim 1, wherein said controller discriminates whether operations for setting the kind of device are in conformity with each other or not, and determines the kind of device of the printing apparatus when a result of discrimination is affirmative.

8. An apparatus according to claim 1, wherein said controller effects a starting process within a range discriminatable by said discriminator upon actuation of a main switch of the printing apparatus, and after the discrimination of said discriminator, said controller controls the apparatus so as to carry out another starting process.

9. An apparatus according to claim 8, wherein said controller does not effect a starting process for the communicating means upon actuation of the main switch of the printing apparatus, and after a discriminating operation of said discriminator as to whether the kind of device of the printing apparatus is determined or not, said controller controls the apparatus so as to carry out the starting process for the communicating means.

10. An apparatus according to claim 1, wherein when said discriminator discriminates that the kind of device is not determined and said detector detects that the recording head is mounted, said communication controller does not prohibit the communicating means from communicating with the information processing apparatus.

11. A control method for a printing apparatus for effecting printing causing a recording head mounted thereto to eject ink, the apparatus including communicating means for communication with an information processing apparatus, said method comprising:

a step of determining a kind of device among a plurality of kinds in response to a predetermined operation for setting the kind of the printing apparatus, and being operable for the kind thus determined;

a step of discriminating whether the kind of device is determined or not;

a step of detecting whether or not the recording head is mounted; and a step of controlling the apparatus in accordance with the determined kind of device, and controlling the communication of the communicating means with the information processing apparatus and transmitting information based on the kind of device to information processing apparatus, wherein in response to detection of mounting of the recording head, said controlling step causes a storing portion of the printing apparatus to store information indicating the kind of ink to be ejected from the mounted recording head stored in the mounted recording head, and said discriminating step discriminates that the kind of device is determined when the storing portion stores the information indicating the kind of ink and discriminates that the kind of device is not determined when the storing portion does not store the information indicating the kind of ink, and wherein when said discriminating step discriminates that the kind of device is not determined, said controlling step prohibits the communicating means from communicating with the information processing apparatus, and when said discriminating step discriminates that the kind of device is determined, said controlling step permits the communicating means to communicate with the information processing apparatus.

12. A method according to claim 11, wherein said control step, when a result of the discrimination of said discrimination step is that the kind of device is not determined, controls the apparatus so as not to respond to a command inquiring information on the kind of device received from the information processing apparatus.

13. A method according to claim 11, wherein said determining step determines the kind of device of the printing apparatus on the basis of the information indicating the kind of ink to be ejected obtained from the recording head mounted thereto.

14. A method according to claim 11, wherein the recording head effects the recording by ejecting ink, and wherein said determining step determines, when an ink container containing the ink to be supplied to the recording head is mounted, the kind of device of the printing apparatus on the basis of the information indicating the kind of ink to be ejected from the mounted recording head obtained from the ink container mounted thereto.

15. A method according to claim 11, wherein the recording head effects recording by ejecting ink, and an ink container containing the ink to be supplied to the recording head is mountable to the printing apparatus, wherein said determining step determines the kind of the printing apparatus when the kind of ink indicated by the information obtained from the recording head mounted thereto and the kind of ink indicated by the information obtained from the ink container mounted thereto correspond to each other.

16. A method according to claim 11, wherein when said discriminating step discriminates that the kind of device is not determined, and said detecting step detects that the recording head is mounted, said control step does not prohibit the communicating means from communicating with the information processing apparatus.

* * * * *